United States Patent Office 3,527,332
Patented Sept. 8, 1970

3,527,332
METHOD FOR ASSAYING GLUTAMATE PYRUVATE TRANSAMINASE
Alfred Deutsch, Los Angeles, Calif., assignor to Calbiochem, Los Angeles, Calif., a corporation of California
No Drawing. Application June 30, 1966, Ser. No. 561,757, now Patent No. 3,413,198, dated Nov. 26, 1968, which is a continuation-in-part of application Ser. No. 320,004, Oct. 30, 1963. Divided and this application June 11, 1968, Ser. No. 736,001
Int. Cl. G01n 31/14
U.S. Cl. 195—103.5
2 Claims

ABSTRACT OF THE DISCLOSURE

Substantially anhydrous, solid assay materials for the determination, inter alia, of reagent for assaying glutamate pyruvate transaminase, are rendered storage stable by the presence of certain polykydric compounds preferably mannitol, sorbitol, lactose or polyvinyl alcohol.

---

This application is a divisional of my copending application Ser. No. 561,757, filed June 30, 1966, now U.S. Pat. 3,413,198, which in turn is a continuation-in-part of my copending application Ser. No. 320,004, filed Oct. 30, 1963 and now abandoned.

The present invention relates to processes and compositions for preparing reagent mixtures for detecting and measuring the presence of certain components in a biological sample. It also relates to the novel reagent mixtures.

In the clinical diagnosis of certain pathological conditions, it is frequently valuable to know the amount of activity or the quantity of certain substances present in a specimen of a biological or other fluid, or tissue. One of the more effective means that has been proposed for making assays of such specimens is to provide a liquid reagent which contains one or more biological components. When a given reagent is mixed with the specimen, the components are effective to cause an enzymatic reaction that involves the unknown substance. By observing this reaction, it is possible to determine the quantity or amount of activity of the unknown originally present.

Since such reagents contain one or more biological components such as enzymes, coenzymes and/or substrates, etc., the reagent has inherently been of a very unstable nature and has very little if any shelf life. To insure the reagent being at optimum strength it must be prepared at or immediately prior to the time the assay is made. In addition, heretofore the various components such as the enzymes, coenzymes, substrates, etc., included in the reagent have been very unstable. To insure these components being at their optimum it has been necessary for the components to be stabilized in a concentrated form.

When it has been desired to make a biological assay of the present type, a "kit" containing the several different components which may be dry, or in solutions, has been obtained. If the components are in a dry form, aqueous solutions are formed, and maintained separately until just prior to use.

The various components for the reagent are present in separate containers and maintained separated from each other. Some of these solutions and particularly those containing the enzymes are necessarily in a concentrated form in order to preserve their activity.

When employing a "kit" of this type, to assay a specimen, it is necessary to first reconstitute the components to the required strength by adding a specified amount of another liquid such as water to various solutions. After all of the various components have been reconstituted, the appropriate quantities of each are combined to form the reagent. A predetermined quantity of the reagent is then mixed wth the specimen to produce the desired assay reactions. The accuracy of the final assay is also dependent upon the accuracy with which components are reconstituted, the accuracy with which the reconstituted components are combined to form the resultant reagent and the accuracy with which the reagent is measured when it is mixed with the specimen. It may thus be seen that the accuracy of the assay is dependent upon the skill of the operator and the accuracy with which he prepares and uses the reagent.

It can be readily appreciated that the foregoing process is very time-consuming particularly when considering the time for using and cleaning the substantial amounts of equipment such as various pieces of glassware, measuring instruments, etc. If any of the equipment has any foreign matter thereon, the reagent may easily be contaminated whereby the result of the assay will be misleading.

It should also be noted that after the reagent is fully prepared, at least one of the components therein and particularly the enzymes are quite unstable and rapidly lose their activity. As a consequence, if the reagent is not used within a matter of a few hours following its preparation, it must be discarded and, therefore, wasted. The percentage of the reagent wasted in this manner becomes very large where only a few assays are made at infrequent intervals.

It may thus be seen that although the foregoing "kits" have been capable of producing the desired reactions and permitting the desired assays to be made they have not been entirely satisfactory for numerous reasons. For example, they have not only been very time-consuming and wasteful, but have also required a person of sufficient skill to insure the accurate preparation of the reagents and their being used in the proper manner. Also, because of the possibility of substantial human errors such reagents have induced a certain degree of unpredictable error in the results of the assay.

It is an object of the present invention to provide means which will be effective to overcome the foregoing difficulties. More particularly, it is proposed to provide new and novel assay materials useful in making biological assays and the method for preparing the materials. All of the assay materials are in a dry, solid state that may be easily handled and used. The assay materials include components such as enzymes, coenzymes and/or substrates which have heretofore been very unstable. Moreover, the combining of such components tends to reduce their stability. However, stabilizers are included that are effective to maintain or preserve the activity of each of the components and of the entire assay material. Each of the components including those containing the enzymes may be stabilized individually and used as such for any desired purpose. Also, the compounds may be combined together to form a new and novel assay material. The resultant assay material contains all of the components except water, for making a liquid reagent that can be used to make a biological assay of the above described type.

Although the assay material contains various components such as enzymes, coenzymes and/or substrates, etc., the material is in a dry, solid form and will be very stable and have a long shelf life. This will permit the assay material to be packaged into containers which are easy to handle and use. Each of the containers may include a quantity of the assay material that is just the right amount for making a particular number of assays, for example a single assay. The assay material may desirably include an agent which, among other things, is effective to increase the volume of the assay material to a standard size whereby the quantity of the assay material required to produce a single assay will always be a standard amount. In order to make an assay, the contents of one of a standard size container may be mixed with a predetermined quantity of water to produce a liquid reagent that is suitable for making a single assay. In addition this agent can facilitate handling during manufacture and increase shelf life. A preferred agent is mannitol. It will thus be seen that the possibility of human errors is eliminated and a relatively inexperienced person may prepare the liquid reagent and make the desired assay without any time-consuming measurements, using any large quantities of glassware, etc.

The term enzymatic assay is defined as the use of an enzyme as a component of a reagent for the determination of a substance or another enzyme, or for the determination of an enzyme in a biological sample.

These and other objectives and advantages of the present invention will become readily apparent from the following detailed description of a limited number of embodiments of the present invention.

The present invention is particularly adapted to be embodied in a dry assay material for determining in a specimen of fluid, particularly of biological origin, the quantity or the amount of activity of a certain unknown.

In the present instance, the unknowns are in a class which for convenience may be divided into four separate groups. The groups include enzymes such as carboxylases, dehydrogenases, hydrolases, isomerases, oxidases, phosphorylases and transferases. By way of example, this group includes: lactate dehydrogenase, alkaline phosphatase, glucose oxidase, muscle phosphorylase, glutamate-oxaloacetate transaminase, phosphoenolpyruvate carboxylase, cholinesterase, glutamate-pyruvate transaminase, malate dehydrogenase, acid phosphatase, prostatic acid phosphatase, esterase, diesterase, lipase, amylase, sorbitol dehydrogenase, glucose-6-phosphate dehydrogenase, isocitrate dehydrogenase, alpha-hydroxybutyrate dehydrogenase, aldolase, glutamate decarboxylase, uricase, galatowaldenase, triose phosphate isomerase, carbonic anhydrase, leucine amino-peptidase, 3-phosphoglyceraldehyde dehydrogenase, trypsin and chymotrypsin. Also included are kinases, like creatine kinase.

The second group includes biochemical intermediates or metabolites. By way of example, the second group includes: glucose, lactic acid, pyruvic acid, adenosine triphosphate, phenylpyruvic acid, 3-methoxy-4-hydroxymandelic acid, cholesterol, creatinine, creatine, urea, uric acid, aspartic acid and glycine.

The third group includes chemical constituents of cells or biological fluids which, by way of example, may include dissolved carbon dioxide, triglycerides, protein, starch, glycogen, hemoglobin and insulin.

The fourth group includes drugs and toxins such as anti-mycin A, diisopropylfluorophosphate, sulfathiazole, ethanol, acetaldehyde and barbiturates.

To assay a specimen for one of the unknowns within a class, a liquid reagent may be mixed with the specimen to produce an enzymatic reaction. The particular reaction that occurs should produce an effect which can be easily measured. By way of example, the optical density of the assay mixture at some predetermined wavelength may change in proportion to the extent of the reaction.

In the present instance, the liquid reagent is prepared by dissolving a dry, solid assay material in water. When this solution is mixed with the specimen an assay mixture will be formed that includes a substrate that will enter into the reaction, an enzyme that will catalyze the reaction, and a coenzyme that will be oxidized or reduced in the course of the reaction so as to produce a desired change in the assay mixture, for example, its optical density. All of the components that are not present in the specimen are contained in the assay material. In addition, one or more substances are included in the assay material to stabilize the assay material and preserve the activity of the various components. In addition, one or more buffer substances may also be provided that will be effective to maintain the conditions in the assay mixture suitable for the reaction to occur at an optimum rate.

The assay material is in a dry, powdered form and contains all of the components except water, for producing an enzymatic assay when combined with the specimen.

Since the assay material is very stable, the powder may be pre-measured into portions which are of just the right amounts for producing an assay reaction in a single specimen or an integral number of specimens. The premeasured quantity of the assay material may be dissolved directly into a suitable quantity of water to form a liquid reagent. The liquid reagent may then be mixed with the specimen to induce the assay reaction in the assay mixture.

If the unknown being assayed is an enzyme, the reagent will not necessarily include an enzyme. Accordingly in one embodiment, the assay material is free of any enzymes but includes one or more components such as a substrate that will react at a rate or to the extent that is determined by the amount of activity of the unknown or enzyme originally present in the specimen.

In a second embodiment of the assay material, a substrate is included which will react with the unknown and an enzyme included in the reagent, that will catalyze the reaction. In order to prepare an assay material of this embodiment, the first step is to select one or more substrates and one or more enzymes that will be effective to produce an enzymatic assay reaction and insure its occurring in the desired manner. The particular enzymes that are chosen will, of course, depend upon the particular unknown to be assayed and the particular reaction which it is desired to create. However, the enzymes will normally be chosen from a class that includes carboxylases, dehydrogenases, hydrolases, isomerases, oxidases, phosphorylases, and transferases. By way of example, this class includes: lactate dehydrogenase, alkaline phosphatase, glucose oxidase, muscle phosphorylase, glutamate oxaloacetate transaminase, phosphoenolpyruvate carboxylase, cholinesterase, glutamate-pyruvate transaminase, malate dehydrogenase, acid phosphatase, prostatic acid phosphatase, esterase, diesterase, lipase, amylase, sorbitol dehydrogenase, glucose-6-phosphate dehydrogenase, isocitrate dehydrogenase, alpha-hydroxybutyrate dehydrogenase, aldolase, glutamate, decarboxylase, uricase, galactowaldenase, triose phosphate isomerase, carbonic anhydrase, leucine aminopeptidase, 3-phosphoglyceraldehyde dehydrogenase, trypsin, chymotrypsin, alpha-hydroxybutyrate dehydrogenase and beta-hydroxybutyrate dehydrogenase.

As is well known, enzymes of this type are generally very unstable. In fact, heretofore, in order to maintain enzymes of this type in a stable condition, it has been necessary to keep them in a concentrated form and at low temperatures. In addition to being concentrated, it has also been usually necessary for the enzyme solution or suspension to include a substantial amount of a salt such as ammonium sulfate to maintain optimal activity.

In the present invention, to prepare the assay material in a dry form, one of the steps in the process is to convert the enzyme from a solution to a dry, solid form such as a powder in which the enzyme is very stable. To accomplish this, one or more stabilizing compounds may be added to the solution containing the enzymes. The particular stabilizers added to the enzyme solution will, in part, vary with the particular enzyme that is to be stabilized. However, for enzymes of this type, at least one stabilizer is chosen from one or more of the following groups. Under some circumstances it has been found to be advantageous to employ a combination of stabilizers which may include a stabilizer from several of the following groups or even a stabilizer from each group.

*Group I.*—Mucilagenous gums or polysaccharides such gum acacia, gum carrageenin, tragacanthin, alginic acid and pectin substances. Gum acacia has been found to be particularly well suited for this purpose. In addition to or as an alternative to the gums, the stabilizer may include other polymers containing hydroxy groups or other hydrophilic substitute groups which render the resultant polymer essentially soluble in water such as, polyvinylpyrrolidine, Carbowax and polyvinyl alcohol. This will also insure all of the assay material dissolving rapidly in the water when the reagent is prepared. However, it is also possible to use any other polymers which because of large chains or hydrophilic substituent is only partially soluble in water but which equilibrate with the aqueous phase such as ion exchange resins, ion exchange cellulose, carboxymethyl cellulose.

*Group II.*—A buffer consisting of a hydroxyalkylamine including but not limited to primary amines such as tris (hydroxymethyl) aminomethane or a tertiary amine such as triethanolamine.

*Group III.*—A sequestering or complexing agent such as ethylene diamine tetraacetic acid or one of its salts which has been found to be particularly well suited.

*Group IV.*—An inert soluble protein such as bovine serum albumin.

*Group V.*—Salts of a polyvalent anion such as ammonium sulfate, or sodium potassium tartrate, which have been found particularly suitable.

*Group VI.*—Sulfhydryl compound such as dithioerythritol, cysteine, or reduced glutathione, which have been found particularly suitable.

After one or more of the stabilizers of the class described above has been completely dissolved or uniformly dispersed throughout the entire mixture, the enzyme or enzymes in the solution are very stable. It has been found that by adding these stabilizers to the solution, the activity of the enzymes is often increased. This is believed to result from the elimination of the effects of certain inhibitors which are usually present with the enzymes. In the event it is desired to decrease the activity of the solution, the solution may be diluted by adding water. Conversely, if it is desired to concentrate or increase the amount of activity of this enzyme solution, a portion of the liquid may be removed. Preferably, the liquid is removed by evaporation while the solution is maintained at a relatively low temperature. It may thus be seen that a very stable enzyme solution is provided at this point and that the stability of the solution is independent of the concentration of the enzyme or the salts therein and exhibits stability over a wider range of temperature.

It is an overall objective to provide an integrated assay material, which is dry, stable, enzymatic, pyridine nucleotide linked, and uniform in results under varying climatic and storage conditions.

The above described stabilized enzyme solution may be used for numerous purposes as a solution. However, under some circumstances such as the preparation of the present assay material, it may be desirable to convert the solution into a dry mixture or powder containing the enzyme. This may be accomplished by lyophilizing or freeze drying the solution. More particularly, the entire solution is frozen to provide a solid mass and placed under a vacuum. The vacuum is of sufficient magnitude to cause the frozen liquid to sublimate. The frozen mass is kept under this vacuum for a period sufficient to insure all of the water, etc., being removed. This will leave a solid residue that contains the enzyme or enzymes in intimate relation with the stabilizers, such as acacia, etc. These stabilizers are effective in preserving the activity of the enzyme for an extended period of time even though the enzyme is in the form of a solid.

The term stabilizer, as used herein, broadly relates to a substance which prevents the change or destruction of a reagent component. It has three major aspects in the present invention, namely: (1) to allow for convenient handling of the components during manufacture; (2) to permit the preparation and storage of a component in dry form; and (3) to provide long-term shelf-life of the finished product.

The residue will normally be in a fluffy or flaky condition. However, if it is desired, the residue may be ground until it is reduced to a finely powdered mixture. The grinding may be accomplished by any suitable means such as a ball mill. The fact that the powder mixture is substantially dry contributes to the chemical stability of the enzymes. It also contributes to the physical stability of the mixture and substantially eliminates the tendency to compact or become lumpy, etc. Since the mixture can be maintained as a loose powder it will be easy to handle and process. Also, it can be easily measured either volumetrically or gravimetrically. At this point a powder is provided that includes one or more enzymes in a very stable form. Since the powder does not include any form of substrate, it can be used as an enzyme for any desired purpose. For example, among other things, the enzyme powder may be employed to complete the preparation of the present assay material.

In order to complete the preparation of the assay material the other components such as the buffers, substrates, coenzymes, and bulking-stabilizing agents, may be prepared for mixing with the stabilized enzymes. It is one of the primary purposes of the buffer materials to maintain the conditions suitable for the assay reaction to occur at an optimum rate. When the assay material is dissolved in water, the buffers will among other things, be effective to maintain the pH of the liquid reagent. In addition, when the liquid reagent is, in turn, mixed with a specimen containing the unknown, the pH of the resultant specimen mixture will still be suitable for the assay reaction to occur.

The particular buffer material that is employed in any particular assay material will be dependent upon the particular assay reaction to be conducted and the other components in the assay material. However, normally, they will be in a class that includes the salts of polyvalent inorganic anions and organic amines together with the acids and salts thereof. By way of example, the salts of polyvalent inorganic anions may include at least sodium and potassium phosphates and sodium and potassium pyrophosphates. By way of example, organic amines and acids, and their salts may include at least tris (hydroxymethyl) amino-methane and imidazole (and their salts, such as the hydrochloride, succinate, sulfate), succinic, aspartic, and glutamic acids (and their salts such as the sodium, potassium, and lithium), glycylglycine, and glycine.

The buffer materials may be prepared in the form of a dry powder that is mixed directly with the lyophilized powder containing the enzyme and the stabilizer. The resultant powder will contain the enzymes required for the assay reaction. Because of the stabilizers and buffers present in the powder, the enzymes will be very stable. This resultant powder like the enzyme powder first described, will not be hygroscopic, in contrast to corresponding mixtures prepared by lyophilization of the combined buffer and enzyme solutions.

The substrate is effective for reaction with the unknown in the specimen. Accordingly, the particular substrate that is employed in any particular assay material will be dependent upon the nature of the unknown and the particular assay reaction that it is desired to produce. Normally, the substrate will be in a class of biochemicals whose chemical reactions will be specifically catalyzed by the classes of enzymes previously described.

The following are specific examples of some of the substrates that fall within this class: Alanine, alpha- or beta-ketoglutaric acid, aspartic acid, fructose-1,6-diphosphate and glucose.

When the assay material is dissolved to form a liquid reagent and the reagent is mixed with the specimen, the substrate will react with the unknown. However, in order for the reaction to occur successfully, it is necessary for the enzyme to catalyze the reaction. The quantity of the substrate and the amount of activity of the enzyme contained in the reagent are in excess of that required to cause all of the unknown to completely react or to react at a desired rate. As a result the only factor that limits the assay reaction will be the quantity or amount of activity of the unknown.

When the substrates are in a pure solid dry form, they may be ground into a dry powder suitable for mixing with the lyophilized powder.

The coenzyme enters into the reaction and is converted from one form to another form. The extent to which the coenzyme is converted is determined by the extent to which the assay reaction progresses. The coenzyme may be readily converted from one form (such as oxidized) to another form (such as reduced). In addition the coenzyme has a light absorption at some particular wavelength only when it is in one of these forms. When it is in the other form, it is transparent at the designated wavelength, although the absorption band may be any desired wavelength that is convenient to use. However, it is desirable that it be distinct from the intense absorption bands of the rest of the components in the assay material and the substances in the specimen. This will insure all of the substances in the reagent and the specimen, except that coenzyme, being transparent or substantially transparent although some of the various components may absorb limited quantities of light in the region of the selected wavelength and they will not vary during the period of assay whereby the only variable will be the coenzyme in the absorbing form. Thus by measuring the optical density at the designated wavelength, the amount of the coenzyme converted may be determined. More specifically, by measuring the amount of change or rate of change of the optical density at the designated wavelength, the amount or rate of the assay reaction may be measured. It has been found that the pyridine nucleotides are particularly well suited for this purpose. When they are in their reduced form, they show absorption of ultraviolet light with a maximum value at a wavelength of about 340 millimicrons. By employing a coenzyme of this class in all forms of the assay material, the assay reactions may be observed by always measuring the optical density at this wavelength.

Coenzymes of this class have a limited amount of stability in a solid form. They can be stored in a solid form for only short periods of time. The stability of the coenzyme may be increased by preparing a lyophilized powder of the coenzyme and acacia. Further increases in the stability of the coenzyme may be obtained by mixing with mannitol. Accordingly, the coenzyme may be ground into a powder and mixed directly with the lyophilized powder containing the enzyme, stabilizer, and buffer.

Heretofore, substrates, enzymes and coenzymes, and buffers have been dissolved in the solution containing the enzyme before lyophilization. The complete solution may then be lyophilized to provide a dry residue containing all of the components of the assay. However, it has been found, as a practical matter, the resultant assay material is often hygroscopic. As a consequence, the residue sometimes tends to absorb varying or unpredictable quantities of moisture. As a result when prepared in this manner it is desirable for the resultant mixture to be hermetically sealed within a container. However, even when hermetically sealed, the mixture may still be unstable and tend to develop colored specks due to local decomposition and in a fairly short time completely decompose or lose its activity. It has also been found that the mixture tends to form into lumps which makes it difficult to handle and measure into small units of identical amounts on a volumetric or weight basis.

This invention teaches that by preparing the various components of the assay material such as substrates and coenzymes in a dry or solid state, and in a stabilized form before the mixing thereof with the lyophilized stabilized enzyme, a much more stable and easily handled assay material is now provided.

In addition to the foregoing components, it has also been found desirable to add a bulking-stabilizing agent to the mixture. This agent may be a polyhydric substance such as mannitol, sorbitol, lactose, polyvinyl alcohol or polymers having from 1 to 5 hydroxyl groups per monomeric unit. The bulking agent is not active in the assay reaction. Accordingly, the quantity of the bulking agent added to the assay material is not critical and may be varied throughout a wide range. However, the bulking agent performs several unexpected and useful functions. First of all, the bulking agent tends to further increase the stability of the assay material for several reasons. Such agents have the ability to absorb and retain limited quantities of moisture whereby the assay material is not materially affected when exposed to reasonable amounts of moisture. This increases the stability of the assay material and prevents its losing its activity. It has also been found that the bulking agent will also be effective in preserving the assay material by increasing the compatibility of its components. It has also been found that bulking agents of this category are also effective in increasing the ability of the assay material to withstand relatively high temperatures, such as 50° C., for longer periods of time. Heretofore, temperatures in this range have caused rapid deterioration of the enzymes, coenzymes, and other components.

Secondly, it has been found that the use of the bulking agent in the assay material results in the assay material dissolving more rapidly into water. This not only reduces the time required for preparing the liquid reagent but also increases the convenience of preparation by reducing the amount of stirring or shaking.

Thirdly, since the bulking agent does not enter into the reaction or affect the components in the assay material, the quantity of the bulking agent added to the assay material may vary over a wide range. Once a batch of the assay material has been prepared, its strength or amount of activity may be determined. The bulking agent may then be added to standardize the assay material to a predetermined level. This will result in the assay material always having a predetermined amount of activity per unit irrespective of the batch in which it is prepared. Of the agents listed above, mannitol is preferred.

After the assay material has had the bulking agent added, it may be divided into units of a standard predetermined size. The size normally will be just large enough to make a single assay or an integral number of assays. Each of these units may then be packaged into a container such as a capsule, glass vial, etc.

It will thus be seen that a plurality of substantially identical packages such as foil containers or capsules may be provided. Each of these capsules will contain just a sufficient quantity of the assay material for making a single assay of a specimen. In order to make an assay, a package containing the assay material for making the particular assay is selected. The assay material contained in the package is all pre-measured and of a predetermined activity. Accordingly, it may be dissolved directly in a standard amount of water so as to form a liquid reagent. This liquid reagent is then mixed with the specimen to produce an enzymatic reaction. The extent of or the rate at which the reaction occurs will be a function of the quantity or amount of activity of the original unknown. Every test, irrespective of the particular type of assay, will involve the conversion of a coenzyme from one form to another form wherein one form has an optical absorption at a predetermined wavelength. Accordingly, the optical density of the specimen at that wavelength will vary as a function of the unknown. Thus, by measuring the optical density of the medium at different times, it will be possible to compute the quantity or amount of activity of the unknown in the original specimen.

The invention sought to be patented in a principal process of making aspect, is described as residing in the concept of preparing an assay reagent, useful, inter alia, as an aid in the clinical diagnosis of pathological conditions to determine the presence of, quantity of, or amount of activity of an enzyme in a biological specimen by mixing therewith a lyophilized, stabilized, catalytic reagent while in substantially anhydrous particulate form, comprising a dry coenzyme, a dry buffer, a dry second enzyme capable of catalyzing the conversion of the coenzyme to the other form of the coenzyme, dry substrates, effective to react with the enzyme of which the present quantity or activity is to be determined.

The invention sought to be patented in a second embodiment of a process of making aspect is described as residing in the concept of preparing an assay reagent, useful, inter alia, as an aid in the clinical diagnosis of pathological conditions to determine the presence of, quantity of, or amount of activity of glutamate pyruvate transaminase in a biological specimen by mixing therewith a lyophilized, stabilized, catalytic reagent while in substantially anhydrous particulate form including the combination of the dry substrates alanine and alpha-ketoglutaric acid, the dry enzyme lactate dehydrogenase, at least one dry stabilizer from the class that includes mucilaginous gums, hyldroxyalkylamines, ethylene diamine tetraacetic acid and its salts, an inert soluble protein and a sulfate anion, a dry coenzyme consisting of reduced diphosphopyridine nucleotide, a dry buffer from the class that includes the salts of phosphates, organic acids and amines, and the salts of said acids and amines, and at least one dry stabilizing-bulking agent from a class that includes polyhydric substances and polymers of said polyhydric substances with from 1 to 5 hydroxyl groups per monomeric unit; which involves determining the optical density of the solid reagent after forming a liquid reagent therefrom and again following a predetermined incubation period after admixing the specimen.

The invention sought to be patented in a first composition of matter aspect, is described as residing in the concept of a substantially anhydrous solid reagent, useful, inter alia, as an aid in clinical diagnosis of pathological conditions to determine the presence of, quantity of, or amount of activity of glutamate pyruvate transaminase in a biological specimen by mixing therewith a lyophilized, stabilized, catalytic reagent while in substantially anhydrous particulate form including the combination of: the dry substrates of alanine and alpha-ketoglutaric acid, the dry enzyme lactate dehydrogenase, at least one dry stabilizer from the class that incdludes mucilaginous gums, hydroxyalkylamines, ethylene diamine tetraacetic acid and its salts, an inert soluble protein and a sulfate anion, a dry coenzyme consisting of reduced diphosphopyridine nucleotide, a dry buffer from the class that includes the salts of phosphates, organic acids and amines, and the salts of said acids and amines, and at least one dry stabilizing-bulking agent from a class that includes polyhydric substances with from 1 to 5 hydroxyl groups per monomeric unit.

Each substance above is present in that quantity so as to insure uniform rate of reaction catalyzed by the unknown being determined, or cause the reaction to go to completion.

EXAMPLE A

The first example of the first embodiment is a solid reagent or assay material that is particularly adapted to be employed for measuring the amount of activity of glutamate-pyruvate transaminase (GPT) present in a serum. This reagent when fully prepared will consist of the dry mixture of the following substances:

Enzyme: Lactate dehydrogenase (LDH)
Buffer: Phosphate buffer ($NaH_2PO_4 + Na_2HPO_4$)
Stabilizer: Tris-(hydroxymethyl)-aminomethane and its sulfate salt, ammonium sulfate, ethylenediamine tetraacetic acid, acacia and albumin
Substrate: Alanine and alpha-ketoglutaric acid
Coenzyme: Reduced diphosphopyridine nucleotide (DPNH)
Bulking Agent: Mannitol In order to prepare a large number of units of this assay material or reagent, the following procedure may be employed to produce a batch of a dry assay material or reagent that may then be divided into small quantities and packaged in containers such as capsules. Wherever quantities are specified, they are suitable for preparing a batch that will yield about 10,000 capsules. However, it should be understood that these values may be varied if it is desired to produce larger or smaller batches.

The first step in the procedure is to prepare a tris-EDTA stabilizer solution. This may be accomplished by mixing the chemicals together in approximately the indicated quantities;

| | G. |
|---|---|
| Tris (hydroxymethyl) aminomethane | 500–1,000 |
| Ammonium sulfate | 250–500 |
| Ethylenediamine tetraacetic acid, tetrasodium salt | 150–300 |

In order to mix these chemicals together the tris (hydroxymethyl) aminomethane is dissolved in a volume of water that is somewhat less than 1 liter to form a first solution. If it is necessary to assist in this dissolving the solution may be heated in a water bath. After the tris is completely dissolved, the solution is allowed to cool to about 25° C. and adjusted to about pH 7.5. This adjustment may be accomplished by adding sulfuric acid in the necessary quantities to convert part of the tris-(hydroxymethyl) aminomethane to its sulfate salt. After the solution is brought to pH 7.5, sufficient water is added to bring the total volume to 1 liter.

Following this, a second solution is prepared by dissolving the ammonium sulfate in 850 to 900 ml. of water. This solution is adjusted to pH 7.5 by the addition of ammonium hydroxide. The first and second solutions may then be mixed with each other to form a resultant solution. The ethylenediamine tetraacetic acid, tetrasodium salt, may then be added to the resultant solution and dissolved therein to form a buffer solution which is sometimes hereinafter referred to as the tris-EDTA buffer.

A dry, lyophilized powder containing the lactate dehydrogenase (LDH) enzyme is then prepared. However, before this powder can be prepared, it is necessary to determine first the amount of activity in the lactate dehydrogenase to be added.

In order to insure that the capsules produced from successive batches will be of identical activity, the activity of the LDH should be standardized at a predetermined level. By way of example, in a batch of 10,000 capsules, there may be about $20 \times 10^6$ Wroblewski units [Wroblewski, F., and LaDue, T. S., Proc. Soc. Exp. Biol. Med. 90, 210 (1955)] for the entire batch, or about 2,000 units per finished capsule. The assay may be made by employing the following chemicals in about the indicated amounts:

| | Ml. |
|---|---|
| Phosphate buffer, 0.1 M, pH 7.5 | 1.75 |
| Sodium pyruvate (3.3 mg./10 ml. of phosphate buffer: reagent 1) | 1.00 |
| DPNH solution, 2.5 mg./ml. of 1% $NaHCO_3$ sol'n | 0.15 |

To begin the assay, the enzyme lactate dehydrogenase is diluted one part to 10,000 by mixing it with the phosphate buffer. A small quantity of the diluted enzyme, such as 0.1 ml. is mixed into a suitable quantity of the buffer solution containing te pyruvate and DPNH. The optical density of the mixture at a constant temperature such as 32° C. is then measured at suitable intervals such as one minute for an extended period such as ten minutes. By determining the average rate of change per minute of the optical density and multiplying by ten (if 0.1 ml. is used), the units of enzyme per milliliter of the diluted enzyme can be determined. Then, dividing by the number of milligrams of enzyme per milliliter, it will be possible to find the number of units of enzyme per milligram. From this, the number of milligrams of the enzyme required to produce the necessary units can be calculated.

Following this, the dry, lyophilized powder containing the lactate dehydrogenase is prepared by mixing the following chemicals in the indicated ranges:

Lactate dehydrogenase (the exact amount is determined by the above assay)—90–100 mg.
Acacia (gum arabic, white powder, U.S.P.)—2–6 g.
Albumin—50–500 mg.
Tris-EDTA solution—10–30 ml.
Ammonium sulfate—15–40 g.

These chemicals may be mixed as follows. First, dissolve the acacia in a convenient quantity of distilled water, for example 80 to 160 milliliters. The albumin is then dissolved in a second quantity of water (for example, 10 milliliters). When fully dissolved, the two solutions are mixed. The tris-EDTA prepared in the beginning is then added to the solution. The solution is now placed under a vacuum for a period of time that will assure all of the trapped air in the solution being removed. The amount of the enzyme lactate dehydrogenase determined by the assay is then added to the solution. The resultant solution is then completely mixed to insure a uniform dispersion of the enzyme throughout the entire solution. The solution is then frozen and a vacuum applied to remove all of the water. The resultant lyophilized mixture will now be in a dry solid state in a quantity in the general range of about 15 to 20 grams. This dry mixture may then be mixed with the dry crystals of ammonium sulfate. The dry mixture of solids may then be pulverized into a fine powder by any suitable means such as placing it in a ball mill for several hours.

After the powder is completely mixed and pulverized to a suffient degree, an assay may be made of the mixture to determine the units of activity of the enzyme lactate dehydrogenase in each milligram of the lyophilized powder. The next step is to distribute the lyophilized powder into the capsules. However, if it is desired to delay this step, the lyophilized powder may be stored for extended periods of time in a cold place such as a refrigerator or freezer. If this is done, it is desirable to include a dying agent near the powder to prevent the absorption of any moisture.

In order to make the capsules, the following are mixed together. Normally, the quantities will be in about the indicated ranges:

Sodium carbonate—(to give pH 7.4 to 7.6)—10 g.
Sodium phosphtate, dibasic—350–1,050 grams
D,L-alanine—1,250 g.±10%
Alpha-ketoglutaric acid—60 g. ±10%
DPNH—6 to 8 g.
Lactate dehydrogenase, lyophilized—$20 \times 10^6$ units.

The first three compounds in the above list are first ground together to form a dry mixture. It has been found preferable to use D,L-alanine recrystallized from water only. L-alanine may be substituted for D,L-alanine, in which case, the amount used is one half that for the D,L compound. The mixture is then placed under a vacuum at a temperature of about 50° C. for a sufficient number of hours to insure all of the moisture being removed. In addition, a drying material such as phosphorous pentoxide may be included in the oven to insure a complete drying. After the foregoing drying step, the alpha-ketoglutaric acid is then added to the mixture formed by the first three compounds. The alanine and alpha-ketoglutaric acid form a substrate for the reaction that takes place when assaying the serum for GPT. Accordingly, the exact amounts of these compounds to be used are determined by the optimum amounts needed to produce a satisfactory reaction. Normally, these will be within the range indicated in the above table.

The resultant mixture of the four compounds is then pulverized into a fine powder, for example, by placing in a ball mill for several hours. When completely mixed into a homogeneous mixture, a small sample may be dissolved in water and the pH determined. If it is necessary, the pH should be adjusted so as to fall within the range of 7.4 to 7.6. If the pH is too low, additional sodium carbonate is added. If the pH is too high, a new mixture similar to the above is prepared in the same manner. However, this mixture is made definitely deficient in sodium carbonate. The second mixture is then blended with the first mixture to bring the pH into the range of 7.4 to 7.6. When the mixture is finished, it is dried again as described above. From this point forward it is important that the powder not be exposed to moisture. Generally, it is best that if the powder is to be exposed to the atmosphere, the relative humidity should be below 15.

The pulverized DPNH and the lyophilized powder containing the lactate dehydrogenase may then be added to the powder mixture just prepared above. Before the DPNH is added, it is dried under vacuum in the presence of phosphorous pentoxide to remove moisture. At the time that the lyophilized powder is prepared, the amount of activity of the lactate dehydrogenase is assayed and a quantity of LDH is computed that would produce a total of $20 \times 10^6$ Wroblewski units for the entire batch (if 10,000 capsules are to be prepared), or 2,000 units per capsule or single assay portion. Accordingly, the quantity of the LDH to be blended into the mixture will be determined from that assay. The quantity of DPNH to be employed is chosen to produce on optical density that is compatible with spectrometers that are suitable for measuring the optical density during the reaction. Normally, the quantity of DPNH will be such as to produce an optical density of the order of 0.8 at 340 millimicrons. This may be checked by dissolving an appropriate quantity of the powder in water (for example, about 4 mg. per 5 ml.) and measuring the optical density.

At this point, a powder is provided that contains the enzyme lactate dehydrogenase, the coenzyme DPNH, and all of the buffers, substrates and stabilizers, to insure the powder being in a stable state that will have a very long shelf life. A sample of this powder is withdrawn (being careful not to introduce moisture) and tested. The tests are for the appropriate optical density, homogeneity with respect to the DPNH, and the effectiveness of the powder to form an assay for glutamate-pyruvate transaminase. Accordingly, this powder may be devided into a plurality of small parts that are just large enough to contain the desired 2,000 Wroblewski units and appropriate quantities of buffer, DPNH, L-alanine and alpha-ketoglutarate to perform a GPT determination in 3 ml. Each part may then be enclosed in a suitable package such as a capsule that will protect the mixture from any moisture.

If a pharmaceutical gelatin capsule is used, a desiccant such as an alumina pellet should be placed with the capsule within the package.

Normally, between successive batches, there will be some variations in the size of the parts into which the mixture is divided as a result of variations in the activity of the LDH. In order to make all of the parts of identical size in all batches, a standard package size in excess of the largest size that will be required is chosen. A suitable quantity of a bulking and stabilizing agent such as mannitol may then be added to the mixture to bring its volume up to an amount that will insure each of the parts having a volume that will just fill the package.

In order to make an assay of a serum for glutamate-pyruvate transaminase or GPT using a capsule of this example, a specimen of the serum is first obtained in a quantity such as 0.1 milliliter. Following this, the contents of a capsule of this type are dissolved. The resultant solution will form a liquid reagent that is of just the right size to make a single assay and may be mixed directly with the specimen. As soon as the reagent and specimen serum are mixed together, the following reactions will occur:

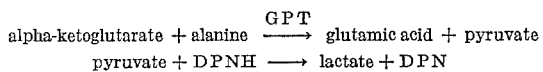

pyruvate + DPNH ⟶ lactate + DPN

Since the alpha-ketoglutarate, alanine and DPNH are supplied in the capsule in excess of that required for the reactions, the only limiting factor is the activity of GPT. The pyruvate formed will thus be proportional to activity of the GPT. When the pyruvate reacts with DPNH, it will be converted to DPN in direct proportion to the pyruvate and, therefore, to the GPT. By placing the assay mixture in a suitable spectrophotometer and measuring the optical density at 340 millimicrons, the rate at which DPNH is converted can be measured. This, in turn, will permit the amount of GPT originally present to be determined.

What is claimed is:

1. The method of assaying a specimen for the enzyme glutamate-pyruvate transaminase, using an assay material comprising a solid, water soluble, substantially anhydrous mixture of:
    (a) the substrates alanine and alpha-ketoglutaric acid;
    (b) the enzyme lactate dehydrogenase;
    (c) the coenzyme reduced diphosphopyridine nucleotide;
    (d) a buffer capable of maintaining the pH between 7.4 and 7.6;
    (e) a stabilizer selected from the group consisting of mucilaginous gums, hydroxyalkylamines, ethylenediamine tetracetic acid and its salts, a source of sulfate anion, and mixtures thereof;
    (f) the stabilizing-bulking agent mannitol;
further; wherein (b) and (e) are a lyophilized mixture; which includes the steps of:
    (i) dissolving in water said material, thereby to produce a liquid reagent having a measurable optical density;
    (ii) mixing said liquid reagent with said specimen to form a specimen-reagent assay mixture; and
    (iii) determining the rate of change of optical density of the reacting specimen-reagent assay mixture.

2. The method of claim 1 in which (e) is a mixture of gum acacia, tris-(hydroxymethyl)-aminomethane sulfate, ethylenediamine tetraacetic acid, and ammonium sulfate.

References Cited

UNITED STATES PATENTS 2,987,450  6/1961  Albaum et al. _____ 195—103.5
3,072,532  1/1963  Innerfield _____ 195—63
3,133,001  5/1964  Puig _____ 195—63

ALVIN T. TANENHOLTZ, Primary Examiner

U.S. Cl. X.R.

105—63